United States Patent [19]

Holland et al.

[11] Patent Number: 5,310,594
[45] Date of Patent: May 10, 1994

[54] COMPOSITE RIGID INSULATION MATERIALS CONTAINING V-GROOVES

[75] Inventors: David L. Holland, Friendswood; Charles M. Nelson, Houston, both of Tex.; Thomas M. Miller, Walnut, Calif.; Jay C. First, Houston, Tex.

[73] Assignees: Rock Wool Manufacturing Co.; Mineral Products and Technology, Inc., Leeds, Ala.

[21] Appl. No.: 884,871

[22] Filed: May 18, 1992

Related U.S. Application Data

[63] Continuation of Ser. No. 474,938, Feb. 5, 1990, abandoned.

[51] Int. Cl.$^5$ ............................ B32B 3/28; F16L 9/18
[52] U.S. Cl. .................................... 428/167; 428/158; 428/159; 428/172; 428/210; 428/212; 428/284; 428/318.4; 138/118.1; 138/128; 138/137; 138/151; 138/158; 52/727; 52/737
[58] Field of Search ............... 428/167, 172, 212, 99, 428/141, 158, 159, 192, 210, 284, 318.4, 343, 354, 906, 913; 52/727, 728, 729, 730, 737, 738; 138/118.1, 120, 128, 151, 150, 107, 158, 157, 170, 167, 137

[56] References Cited

U.S. PATENT DOCUMENTS

| | | | |
|---|---|---|---|
| 3,092,529 | 6/1963 | Pearson | 138/157 |
| 3,212,529 | 10/1965 | Ullman et al. | 138/157 |
| 3,251,382 | 5/1966 | Tatsch | 138/157 |
| 3,615,149 | 10/1971 | Malone et al. | 138/151 |
| 3,969,868 | 7/1976 | Bainter et al. | 428/167 |
| 5,013,597 | 5/1991 | Kracke | 428/158 |

FOREIGN PATENT DOCUMENTS 2409855  7/1979  France ........................... 418/906

*Primary Examiner*—Donald J. Loney
*Attorney, Agent, or Firm*—Robert J. Veal

[57] ABSTRACT

Flat, rectangular composite insulation comprising two dissimilar insulating materials on a separate flexible backing material is described. At least one of the two dissimilar materials is rigid. V-grooves are formed in the dissimilar materials extending from the surface of the insulation opposite of the flexible backing up to, but not through the flexible backing. The V-grooving permits the rigid composite insulation to be fitted to a curved surface such as a pipe.

16 Claims, 5 Drawing Sheets

COMPOSITE RIGID INSULATION MATERIALS CONTAINING V-GROOVES

This is a continuation of copending application Ser. No. 07/474,938 filed on Feb. 4, 1990 now abandoned.

RELATED APPLICATIONS

This application is related to commonly assigned U.S. Pat. No. 4,838,968 issued Jun. 13, 1989, and to Price et al, U.S. Ser. No. 364,452 filed Jun. 12, 1989 now U.S. Pat. No. 4,954,202 entitled "Apparatus and Method for Making V-Groove Insulation."

FIELD OF INVENTION

The present invention relates to composite insulation materials. More particularly, the invention relates to insulation made up of at least two dissimilar insulating materials, at least one of such materials being rigid, which have V-grooves therein to permit the composite insulation to fit around and insulate, inter alia, pipe.

BACKGROUND OF INVENTION

U.S. Pat. No. 4,838,968 and U.S. Ser. No. 364,452 filed Jun. 12, 1989 now U.S. Pat. No. 4,954,202 each commonly assigned, disclose a method and apparatus for making V-grooved insulation from rigid material. As disclosed therein, a rigid, or semi-rigid board, such as mineral wool, is carried by a conveyor through a series of steps wherein a backing material is applied to one surface of the board and the board subsequently automatically V-grooved with a series of V-grooves, with the V-grooves extending up to but not severing the backing layer. The disclosed apparatus and process permits the manufacture of V-groove insulation wherein the spacing of the V-grooves can be varied and controlled in order that diameters. The '968 patent and the aforesaid application do not disclose layered or composite materials.

Various forms of layered sheet materials are, however, described in the art which can conform to the shape of another material, for example, insulation material conforming to the shape of a pipe. It has been difficult and impractical heretofore to provide a material which will readily and smoothly conform to a given surface and which also is easily managed in storage and shipment prior to use. Unless separate sheets are layered upon one another at the time of installation, an insulation covering has essentially been of one material having a single insulation property.

More specifically, U.S. Pat. No. 4,576,206 describes a semi-cylindrical pipe insulation sleeve made up of an outer layer of mineral wool and an inner layer of mineral wool. The insulation sleeve is made utilizing a mold. First, an outer layer is formed containing V-shaped slits therein. The outer layer is hardened and placed in a mold for a semi-cylindrical sleeve. At this point, the V-shaped slits are closed. The inner layer, which is initially flexible, is hardened after placement in the inner surface of the outer layer in the mold. A thermosetting binder is used to harden the layers. The binder additionally holds the two layers together following a heat treatment of the layers. In addition to the complexity of manufacture, due to the semi-cylindrical shape of the insulation sleeve with two sleeves being necessary to encompass a pipe, shipping due to space requirements is not economical.

To the extent the art discloses other layered sheet materials useful as an insulation material, those sheet materials have only a single layer of material having insulating properties. The other layer or layers present merely serve as backing or boundaries to maintain the integrity of the insulation material. For example, U.S. Pat. No. 3,557,840 describes a sandwich insulation board having a core of rigid cellular plastic foam and two outer deformable skin surfaces which effectively act as mold surfaces. The foam is formed in situ between the deformable skins or mold surfaces. The skin surfaces which can be a polymeric material, paper, wood sheeting, dry or asphalt saturated felts, or wood or batting fibers do not have substantial insulative property, and are not intended to be insulating materials. "Insulating materials" as used herein means a material having low heat conductivity and able to withstand high temperatures without degradation or destruction.

Where individual strips or sections have been utilized to form a unitary sheet material, the sections are each made of the same insulative material and do not form a composite material. The backing material utilized to hold the segments together again does not have substantial insulating properties. For example, U.S. Pat. Nos. 2,776,231 and 2,890,739 describe segmented insulating coverings for pipes or the like made up of two facing layers and an inner insulative layer. The first outer layer is a web material such a kraft paper and the second outer layer is a material such as aluminum foil. The inner layer is made up of parallel segments of either foam glass or baked cork having a prismatic or truncated configuration which are adhered to the other layers by an adhesive. The prismatic or truncated shapes allow for the folding of the insulating material around a pipe.

The use of wire as an integral part of an insulating sheet has been described in the art as reinforcement for the insulation material. In U.S. Pat. No. 1,734,209, a pipe insulating jacket made up of rock wool and a backing is described. Grooves are formed in the insulating material. Reinforcements, such as a wire mesh or stapling, are positioned in the rock wool so that the reinforcements extend from the backing to the opposite surface of the insulation material. Wire integral with a composite V-grooved material is not disclosed in the art for fastening the composite together or to another structure. The fastening of a sheet material to another structure to which the sheet material conforms has conventionally used an adhesive flap at one end of the sheet material, or the like, for example as described in U.S. Pat. Nos. 2,890,739 and 3,117,902.

The art also does not disclose the use of or the advantages of an adhesive applied to a V-grooved material in a selective manner to provide a hinge. U.S. Pat. No. 3,084,403 teaches the use of a hinged structure with a normally rigid grooved material. However, the hinge is provided by the backing which is inserted into the grooves formed in the rigid material and not through the selective placement of adhesive in the grooves. Otherwise, the art discloses the use of an adhesive to cover an entire surface to prevent separation of material. For example, U.S. Pat. No. 4,576,706, as described above, uses a binder sprayed indiscriminately on the insulation material to maintain the V-shaped slits closed.

SUMMARY OF INVENTION

It has now been found that the method and apparatus described in the aforesaid '968 patent and application Ser. No. 364,452 now U.S. Pat. No. 4,954,202 can be utilized to make a composite insulation tailored to more particularly meet the requirements of a given insulation application. Thus, a composite insulation material can be provided according to the present invention wherein the insulation contains a first flexible backing layer, a second layer of a first insulating material having a desired characteristic, and at least one additional layer of insulating material having dissimilar insulating or other characteristic, at least one of the layers being rigid. "Rigid" as used herein defines a structure which will not, without modification, adapt to a shaped surface. For example, the first insulating material adjacent to the backing can be mineral wool which is a rigid material having excellent insulating properties and is relatively low in cost, but which is not particularly desirable from the standpoint of structural support or moisture resistance. The second layer of insulating material can be foam glass which again is rigid, but which has good characteristics with respect to structural support and resistance to moisture but, because it is brittle and relatively non-conformable, is not easily fabricated as a single component structure.

In another embodiment the composite insulating material comprises in the transverse direction a section of a material such as mineral wool, a narrow strip of a second material such as perlite; followed by a second section of mineral wool, a second strip of perlite, and an additional section of mineral wool. This composite when V-grooved and used to wrap piping or the like will combine the excellent insulating characteristics of mineral wool and relatively low cost, but which because of its low density will not support a heavy load, including the weight of certain pipes, and the characteristics of perlite which, being of high density and resistance to weight, will provide the necessary support for carrying a heavy load. As will be more apparent from the following description, other dissimilar materials can be used in the composite so as to provide differing characteristics and to also permit the use of relatively inexpensive materials with more costly materials to provide a total composite having the essential insulating properties and within a desired price range.

In another embodiment of this invention, the V-grooved materials of the invention have applied to the backing layer a plurality of evenly spaced wires to permit the convenient application of the insulation to piping or the like. In this embodiment it is essential that the wires extend beyond the ends of each section of pipe insulation in order to permit the wires to be attached to each other to hold the insulation in place.

In still another embodiment of this invention, one face of at least some of the V-grooves of the insulation section is coated with an adhesive material, preferably automatically after the V-grooves are cut into the insulation on the V-grooving apparatus. Accordingly, when the V-groove insulation is shaped, the adhesive on the one face of the V-groove will adhere to the opposite face of the V-groove to retain a given shape. In a modified embodiment, all of the V-grooves will have one face coated with the adhesive except for the center V-groove of the insulation section. In this embodiment the backing layer of the insulation section where the V-groove is not coated will serve as a hinge. The insulation can, therefore, be shipped from the place of manufacture to the place of use as a flat board. At the place of use the sections can be shaped and will adhere together as two half circles due to the hinge effect and then attached as half sections to a pipe. This feature is advantageous economically due to the savings in shipping costs and also ease of application to a pipe surface.

The invention will be described in detail in reference to the drawing. From this description the above and other features of the invention will be fully apparent.

DESCRIPTION OF THE PREFERRED EMBODIMENT

Figure 1:
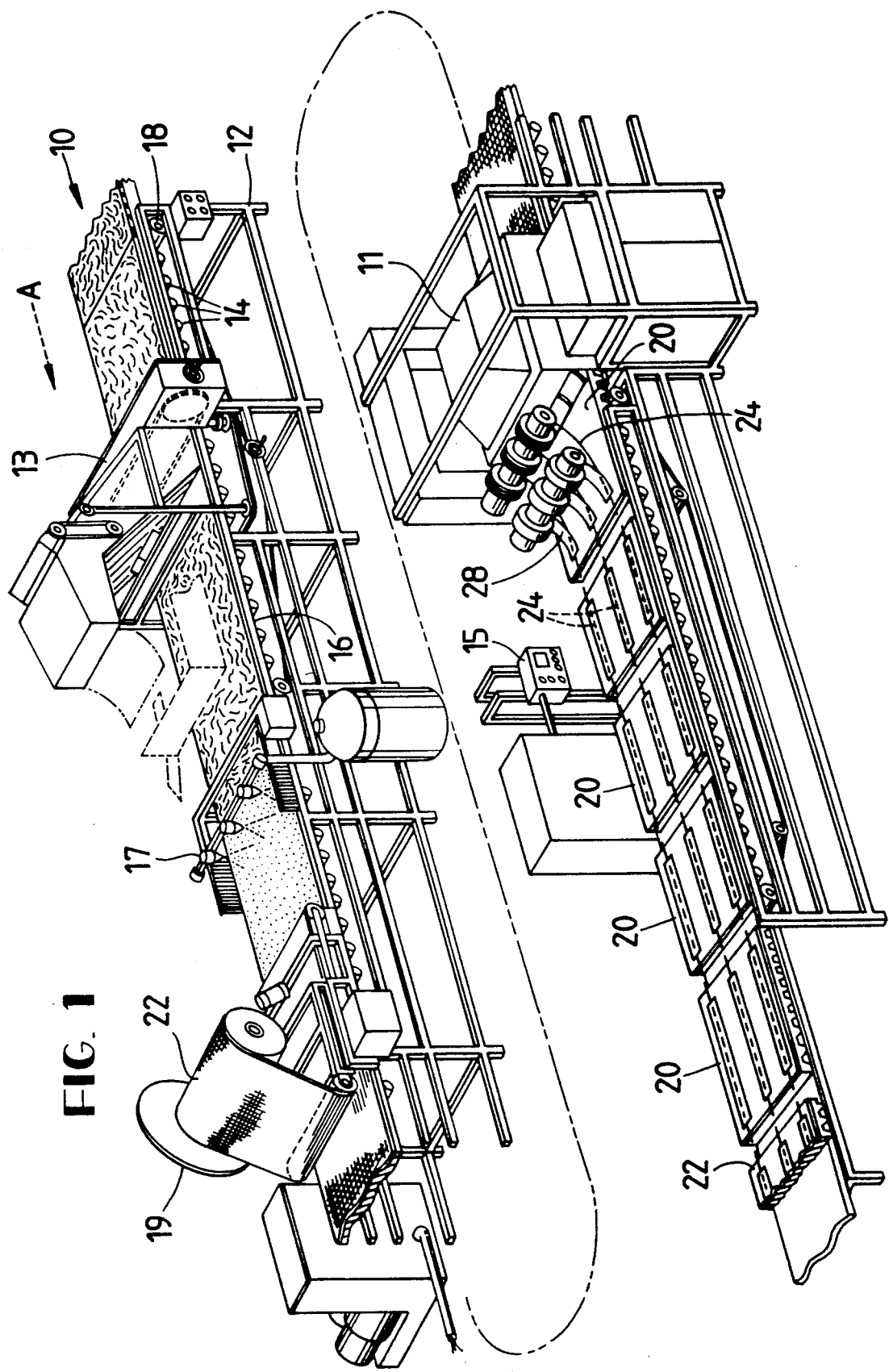
FIG. 1 is a perspective view of a V-groove machine as shown in U.S. Ser. No. 364,452, now U.S. Pat. No. 4,954,202 further including means for fixing a wire to the backing layer of the individual insulation sections.

As illustrated in FIG. 1, the V-grooving apparatus 10 is comprised of a combination of stations each disposed along, above, or approximate to an endless track conveyor system. The conveyor system as defined in Ser. No. 364,452, now U.S. Pat. No. 4,954,202 incorporated herein by reference, comprises an upright tubular frame 12 along the top of which are secured a plurality of rollers 14, or the like, to form a bed 16. Flexibly disposed over these rollers 14 is a conventional looped belt arrangement, not shown, driven by a motor through guide rollers 18 such that the material placed atop the system will be moved longitudinally down the frame 12 for processing as shown by direction arrow A. The travel rate of the conveyor system and the different functions are controlled by a microprocessor 15 which also governs the placement and frequency with which the V-grooves are cut in a given insulation section 20, or at which severance of the insulation section 20 occurs.

Figure 2:
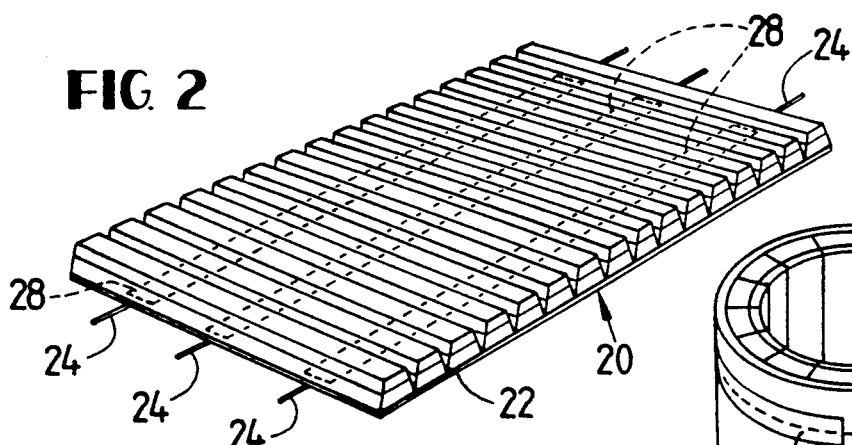
FIG. 2 is a perspective view of one section of a composite insulating material, viewed from the surface opposite of the backing layer, including the attachment wires.
Figure 3:
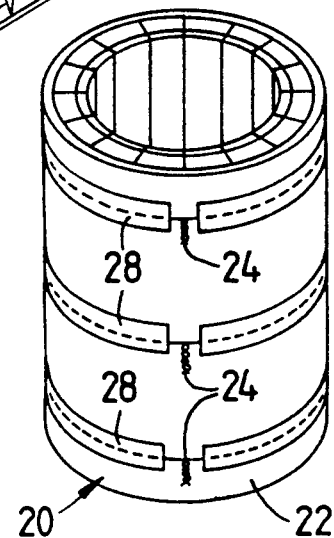
FIG. 3 is a perspective view showing the insulation section of FIG. 2 in a wrapped configuration.

More specifically, insulation materials are positioned on the conveyor in layers or in longitudinal sections, depending upon the ultimate insulation configurations desired. At times it may be desirable to adhere the layers or sections together by applying an adhesive. However, this is not normally necessary since the layer or sections are held together by the backing to be applied or the shape of the V-grooves. After proper shaping in shaper 13, the insulating material is sprayed with an adhesive at station 17, with a backing 22 being applied at station 19. The backed material is passed through a saw station 11, at which point V-grooves are positioned in the lower surface of the composite insulation material 20 as fully described in application Ser. No. 364,456 now U.S. Pat. No. 4,954,202. Thereafter, attaching wires 24 are applied to the backing material 22. Thus, after going through the V-grooving section, the microprocessor 15 is programmed to provide a space between each of insulation sections 20, for example using a stepping motor. A plurality of wires 24 are uniformly spaced on the outer surface of the backing member, with the timing being controlled so that there is a length, approximately an inch and one-half (1½"), of wire extending beyond the leading edge of the insulation section 20, and the wire is cut after the trailing edge of the section is sensed and an additional length of approximately an inch and one-half (1½") extends beyond the section. Simultaneously, a tape 28 is applied over the wire in order to firmly affix the wire to the insulation section. The insulation section 20 comprising the wire is shown in FIG. 2 and is shown in the wrapped position in FIG. 3.

Figure 4:
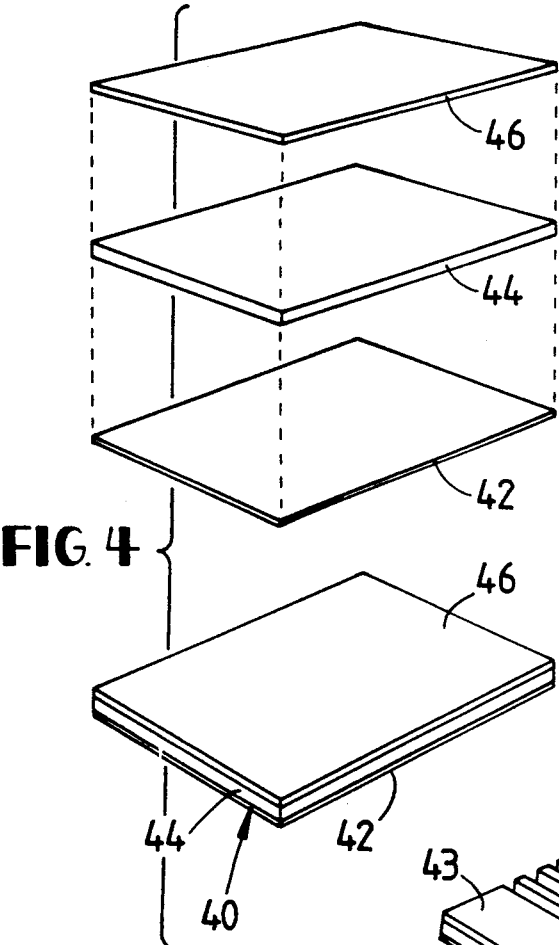
FIG. 4 is an exploded view of a composite insulation section comprising a backing layer, a first insulating layer, a second insulating layer, and all three of the layers together as a composite.
Figure 6:
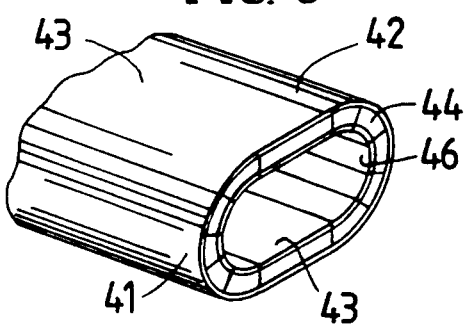
FIG. 6 illustrates the section of FIG. 5 in the closed or wrapped configuration.
Figure 5:
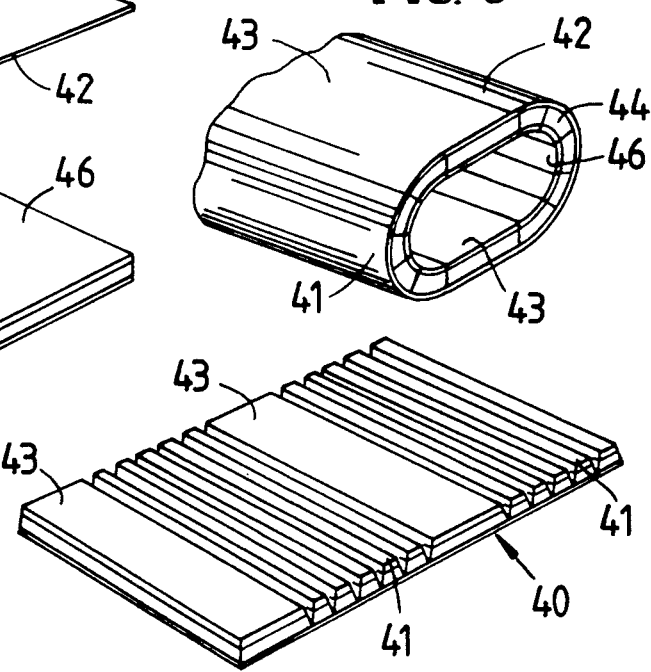
FIG. 5 illustrates the insulation section of FIG. 4 having V-grooves contained therein, but spaced so as to provide an oblong structure when wrapped.
Figure 7:
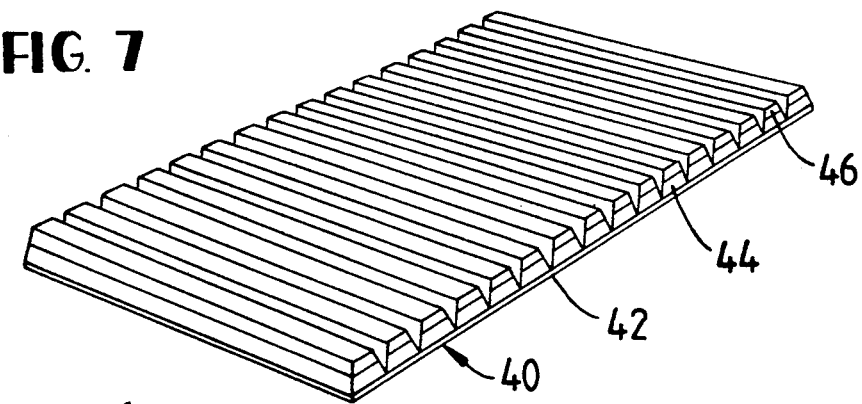
FIG. 7 is a perspective view of the insulation section of FIG. 4 V-grooved uniformly across the length so as to provide a circular configuration when closed or wrapped.
Figure 8:
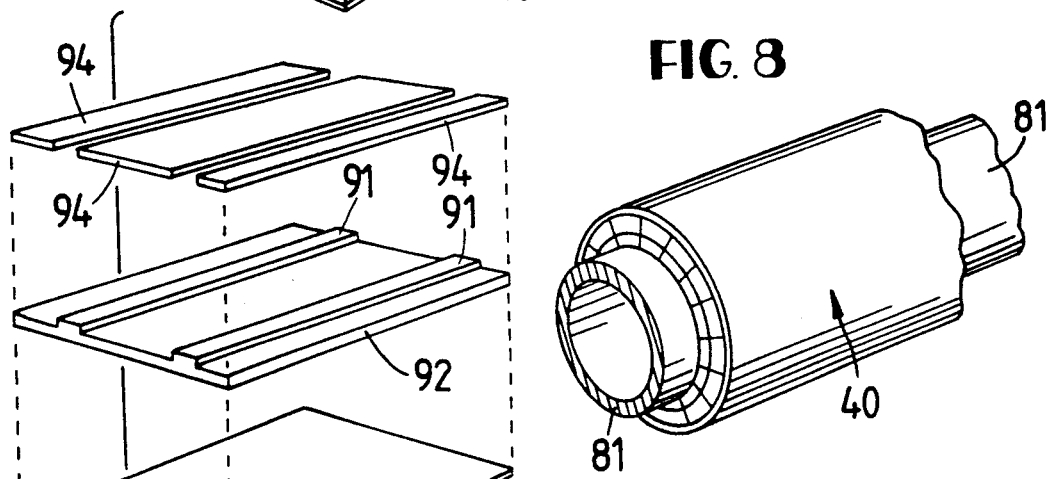
FIG. 8 is a perspective view showing the insulation section of FIG. 7 wrapped around a pipe.

FIG. 4 illustrates a first embodiment of the invention. In this embodiment composite insulation 40 comprises a backing layer 42, a first rigid insulating material 44, and a second rigid insulating material 46. This total composite 40, after being V-grooved, can be used to wrap various shaped objects, depending upon the spacing and frequency of the V-grooves. As shown in FIG. 5, there is a first length of close V-grooving 41, followed by a length 43 where there are no V-grooves, followed by a length of close V-grooving 41, followed by an additional length 43 where there is no V-grooving. When the V-grooved section is wrapped or closed, the insulation will have an oblong shape as shown in FIG. 6, permitting the insulation to cover an oblong object such as a plurality of cables or cable trays, I-beams, or the like. When the insulation is uniformly grooved as shown in FIG. 7, the composite insulation can be used to wrap a round pipe 81 as illustrated in FIG. 8.

Figure 9:
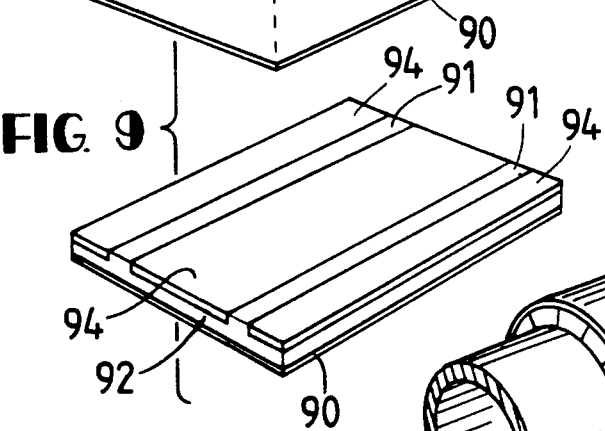
FIG. 9 is an exploded view of a composite insulation section comprising a backing layer, a first insulating layer including strips of the material extending lengthwise of the section, and strips of a second insulating material positioned on each side of and between said strips.
Figure 10:
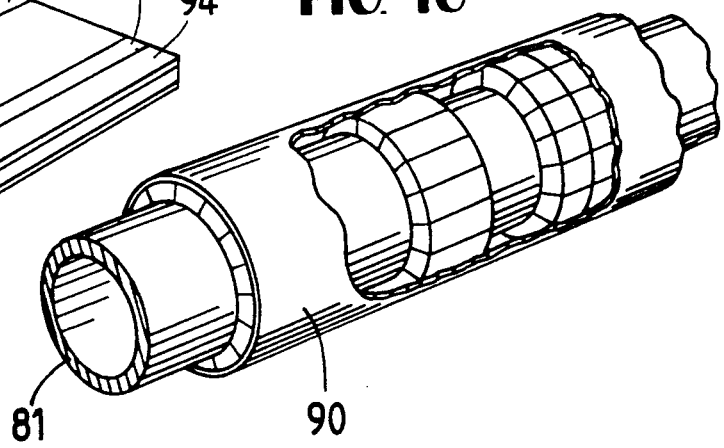
FIG. 10 is a perspective view, partly in section, showing the insulation section of FIG. 9 V-grooved and wrapped on a pipe.

FIG. 9 is an additional embodiment of the invention comprising a backing member 90 and a first rigid composite material 92 shaped to have raised sections 91. Positioned around these raised sections is a second dissimilar insulation material 94. This material when V-grooved for circular orientation and wrapped around a circular pipe 81 has a cross-section as shown in FIG. 10.

Figure 11:
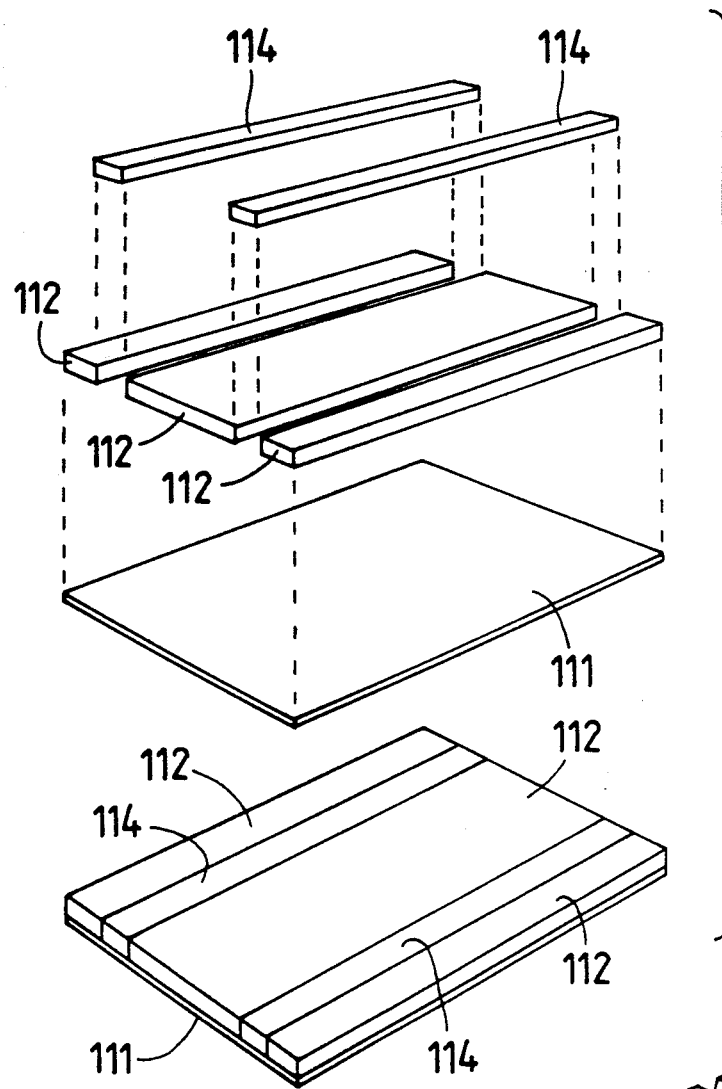
FIG. 11 is an exploded view of still another embodiment of the invention wherein the backing layer has a plurality of longitudinal sections of a first insulating material and strips of a second insulating material affixed thereto.
Figure 12:
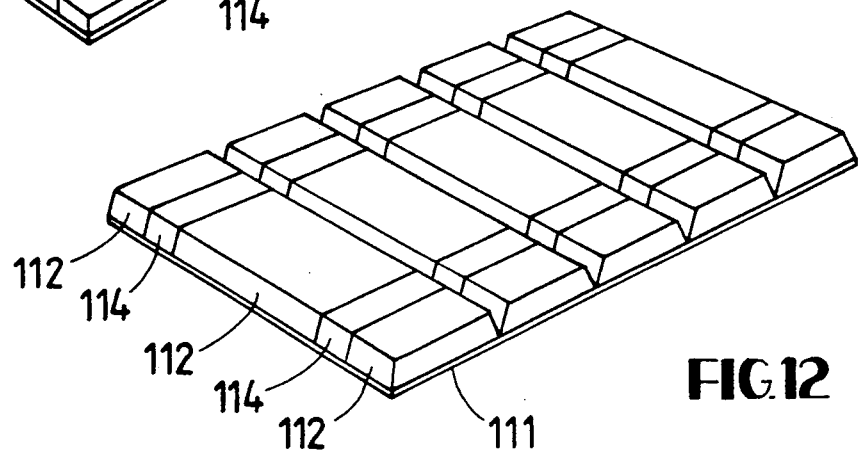
FIG. 12 is a perspective view of the insulation section of FIG. 11 V-grooved.

In FIG. 11 the composite material comprises a backing member 111 and, affixed to the backing member, a first insulating material 112 extending in the longitudinal or machine direction; a longitudinally or machine direction positioned dissimilar insulating material 114, followed by a second section of the first insulating material 112; then a second strip of longitudinally extending dissimilar insulating material 114 and an additional section of material 112. This provides, therefore, a composite insulation having a flexible backing member and a first insulating material with strips of a second insulating material extending longitudinally through the section. This material when V-grooved will have the configuration of FIG. 12.

It is not necessary in most composite structures made in accordance with this invention to have the various materials glued together. Because of the V-grooving and the positioning of the backing material, the materials are normally held together without adhesive. It is, of course, possible, to apply adhesive between the different composite materials if desired. If it is desired to do so, this is done at the time the materials are positioned on the conveyor.

Figure 13:
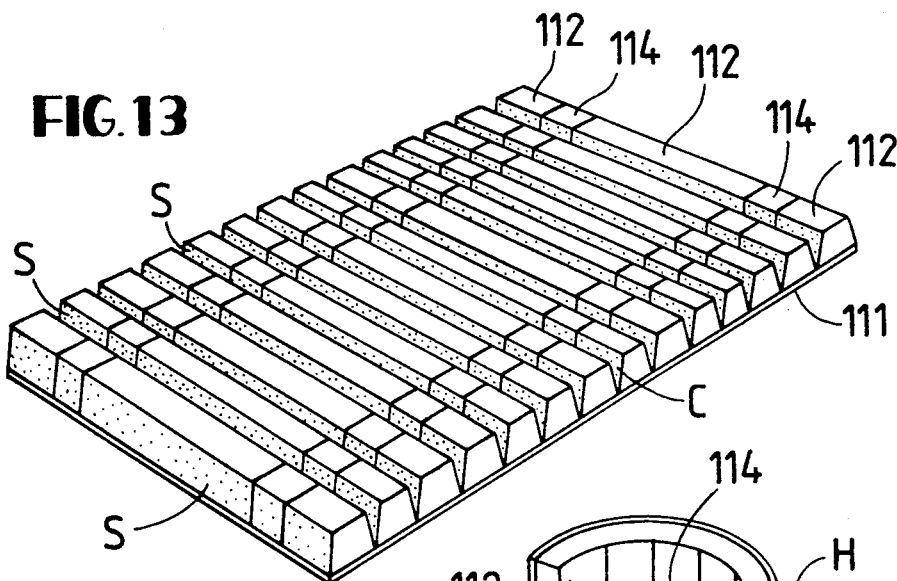
FIG. 13 is a perspective view of the insulation section of FIG. 11 wherein the V-grooves are spaced to fit around a circular pipe and having one face of each of the grooves coated with an adhesive but for the middle groove.
Figure 14:
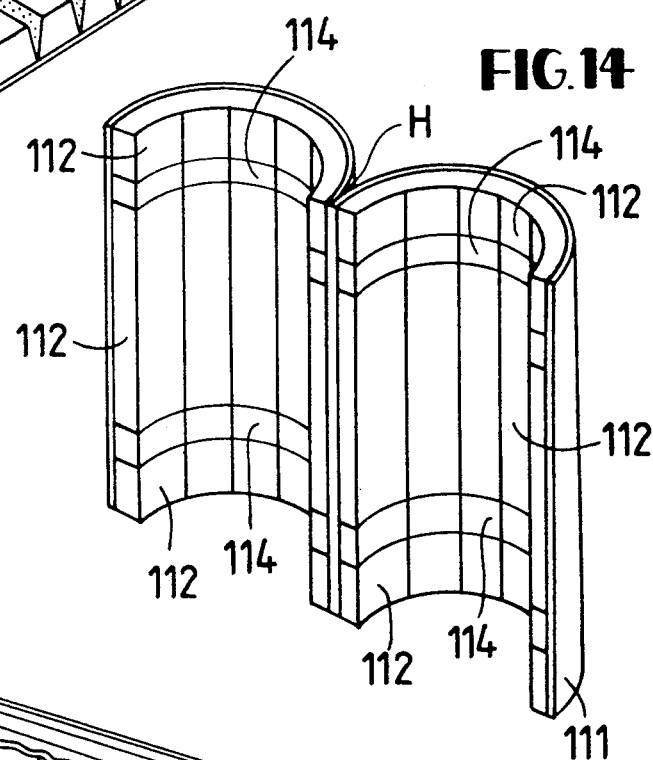
FIG. 14 is a perspective view illustrating the insulation section of FIG. 13 with the insulation wrapped or closed so as to provide two half circles hinged through the flexible backing layer at the mid-point where the V-groove is not coated with adhesive.
Figure 15:
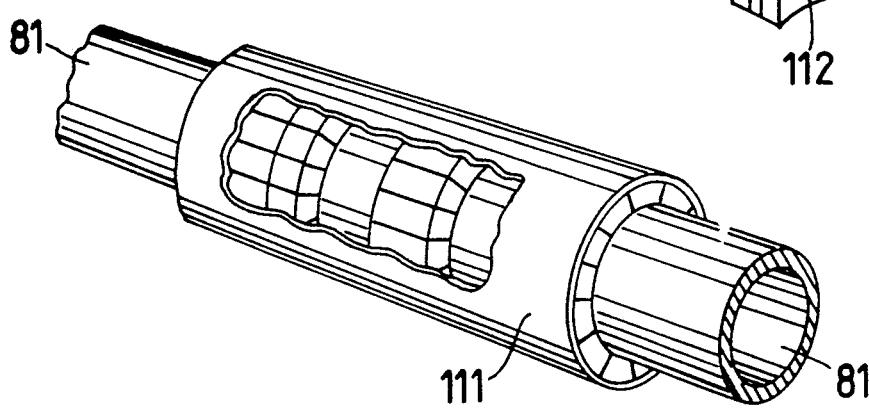
FIG. 15 illustrates the insulation section of FIG. 14, partly in section, wrapped around a pipe.

FIG. 13 illustrates an embodiment of the invention wherein after the material is V-grooved an adhesive S, such as a pressure-sensitive adhesive, is applied to one face of the V. If the adhesive is applied to one face of each of the grooves, when the material is closed at the time of installation the V-grooves will automatically adhere together in the closed configuration, providing ease of application and use of the insulation. However, if, as shown in FIG. 13, one V-groove C in the center of the section does not contain an adhesive, the backing layer at that V-groove will provide a hinge H. Thus, when the insulation section is in the closed configuration, as shown at FIG. 14, the center section will form a hinge for the two formed half-sections, permitting simplified installation on a pipe 81, or the like, as shown in FIG. 15.

As is apparent, the composite insulating materials of the present invention can be tailored through use of insulating materials having diverse properties to provide composite sections of insulation ranging in width of from about four feet down to a few inches. Particularly preferred embodiments comprise layered composites, wherein "layered" means a stacking of the diverse materials one on top of the other, composed of pairs of rigid materials as follows: mineral wool-foam glass; mineral wool-polyurethane foam; mineral wool-ceramic fibers; or pairs of rigid material and flexible material as follows: mineral wool-ceramic fiber blanket; mineral wool-flexible polyurethane foam. It is also possible to use three or more insulating materials. In these embodiments the mineral wool component can vary in thickness from about one-half inch to about four inches in thickness, with the second component varying from about one-half inch to about four inches in thickness to provide a total insulation thickness of from about one inch to five inches. The combinations of materials provide composite insulation having the advantages of one material—such as good insulative value, while minimizing disadvantages of the material—such as the difficulty of working with a material such as foam glass due to its brittleness and its relative non-conformability to diverse shapes. Additionally, the composite insulation provides economy through the use of a relatively costly material such as ceramic fiber where needed and the use of a relatively inexpensive material such as mineral wool where the properties of ceramic fiber are not necessary. For example, it is recognized that the insulation material closest to a pipe being insulated is subject to the greatest heat, and as the distance away from the pipe increases the material is subject to less heat, permitting the use of a material having a lower thermal value such as mineral wool.

In still other preferred embodiments, sections of material such as mineral wool are separated longitudinally or in the machine-direction with strips of a diverse material such as perlite. Such composites provide the advantages of mineral wool including relative low cost, but which suffer from low structural strength, with the high structural strength provided by perlite. This permits a strengthened insulative structure which resists high load bearings, including the weight of a pipe, and/or permits the structure to be stepped on particularly at diverse locations.

As is apparent, in addition to having strips of the high-density material in select locations, the insulative section can comprise one-half of one rigid material and one-half of another rigid material. The insulative section can be positioned on a pipe to have the one material such as perlite positioned at the top so that the entire structure can be stepped on without damage to the insulation. As will be apparent to one skilled in the art, various modifications can be made to the composite insulation sections to utilize materials varying in cost and property characteristics. Proper selection of materials permits use of the insulation to cover pipes, commercial grease ducts, commercial and industrial cable trays, structural steel supports such as I-beams and the like, large chemical tanks, and virtually any structure where structural integrity is essential.

As will be apparent to one skilled in the art, various modifications can be made within the scope of the aforesaid description. Such modifications being within the ability of one skilled in the art form a part of the present invention and are embraced by the appended claims.

It is claimed:

1. A flat, rectangular composite insulation comprising at least two dissimilar layers of insulating material, at least one of said two dissimilar layers of material being rigid, and a separate flexible backing material disposed at one surface of said flat insulation, and a plurality of V-grooves formed at predetermined spaced intervals in said at least two dissimilar layers of material which extend substantially through said dissimilar layers of material from a second surface of said insulation opposite of said flexible backing material up to, but not into said backing material, each of said plurality of V-grooves being defined by a pair of opposed faces, with selected pairs of opposed faces being selectively urged to an abutting relationship with said second surface defining at least one substantially curved surface responsive to the abutment of said opposed faces.

2. The composite insulation of claim 1 wherein said at least two dissimilar layers of material are layers positioned one on top of the other.

3. The composite insulation of claim 1 wherein said at least two dissimilar layers of material are positioned in a side by side relationship.

4. The composite insulation of claim 2 wherein there are two dissimilar layers of material and both are made up of rigid materials.

5. The composite insulation of claim 4 wherein one rigid material is mineral wool and the other rigid material is glass foam.

6. The composite insulation of claim 4 wherein one rigid material is mineral wool and the other rigid material is a polyurethane foam.

7. The composite of claim 4 wherein one rigid material is mineral wool and the other rigid material is a rigid ceramic fiber layer.

8. The composite insulation of claim 2 wherein there are at least three layers of insulating material.

9. The composite of claim 2 wherein there are two dissimilar layers of material, one being rigid and the other being flexible.

10. The composite of claim 9 wherein the rigid material is mineral wool and the flexible material is a polyurethane foam.

11. The composite of claim 9 wherein the rigid material is mineral wool and the flexible material is a flexible ceramic fiber blanket.

12. The composite of any of claims 1-11 wherein a plurality of flexible wires are spaced across and fixedly attached to the outer surface of said flexible backing material, and said wires extending beyond each of said leading and trailing ends of said insulation a length sufficient to permit attachment of said wire ends together.

13. The composite of any of claims 1-11 wherein at least some of said V-grooves have an adhesive coating on one face of said V-grooves.

14. The composite of claim 13 wherein all of said V-grooves but the center V-groove of the section has an adhesive coating on one face of said V-groove.

15. A flat, rectangular composite insulation comprising at least one layer of insulating material and a separate flexible backing material disposed at one surface of said insulating material, a plurality of V-grooves present in predetermined spaced intervals in said insulating material and extending from a second surface of said insulation opposite of said flexible backing material up to but not into said backing material said backing material integrating said backing material integrating said insulation intermediate said V-grooves, each of said plurality of V-grooves having opposing faces with selected ones of said faces selectively urged into abutting relationship with said second surface defining a substantially curved surface and a plurality of flexible wires spaced across and fixedly attached to the outer surface of said flexible backing material, and said wires extending beyond each of said leading and trailing ends of said insulation a length sufficient to permit attachment of said wire ends together so as to hold said selected faces in abutment to define said curved surface.

16. A flat, rectangular composite insulation comprising at least one layer of insulating material wherein at least one layer of said insulation material is rigid and a separate flexible backing material disposed at one surface of said insulating material, a plurality of V-grooves which are defined by opposing faces cut at predetermined spaced intervals in said insulating material so as to extend from a second surface of said insulation opposite of said flexible backing material up to but not into said backing material, with said insulation and backing material being integral and folded to define at least one substantially curved surface by abutment of selected ones of said faces of V-grooves; and, an adhesive coating on said selected faces of V-grooves.

* * * * *